United States Patent [19]

Elings et al.

[11] Patent Number: 5,066,858
[45] Date of Patent: Nov. 19, 1991

[54] SCANNING TUNNELING MICROSCOPES WITH CORRECTION FOR COUPLING EFFECTS

[75] Inventors: Virgil B. Elings; John A. Gurley, both of Santa Barbara, Calif.

[73] Assignee: Digital Instruments, Inc., Goleta, Calif.

[21] Appl. No.: 510,612

[22] Filed: Apr. 18, 1990

[51] Int. Cl.$^5$ .............................................. H01J 37/00
[52] U.S. Cl. .................................... 250/307; 250/306
[58] Field of Search ...................... 250/252.1, 306, 307, 250/423 F

[56] References Cited

U.S. PATENT DOCUMENTS 4,889,988 12/1989 Elings et al. .................. 250/306

OTHER PUBLICATIONS

"Scanning Tunneling Microscopes Instrumentation", Kuk et al., Rev. Sci. Inst. vol. 60, No. 2, Feb. 1989, pp. 170–171.

Primary Examiner—Bruce C. Anderson
Attorney, Agent, or Firm—Charles H. Schwartz; Ellsworth R. Roston

[57] ABSTRACT

A scanning tunneling microscope is corrected in real time for coupling effects from the scanning electrodes or bias voltage circuit of the microscope on the tunneling current. In an automatic embodiment, a test voltage waveform is applied to the scanning electrodes or bias voltage circuit, the system determines the correction required and corrects the tunneling current signal. A method enables the operator to verify the correction. In other embodiments, predetermined values of the parameters of the coupling effects are entered by the operator; the system determines the correction required from these values and corrects the tunneling current signal with this correction; the correction is verified, and the operator enters an adjustment of the values, if the corrections did not sufficiently correct for the coupling effects.

28 Claims, 3 Drawing Sheets

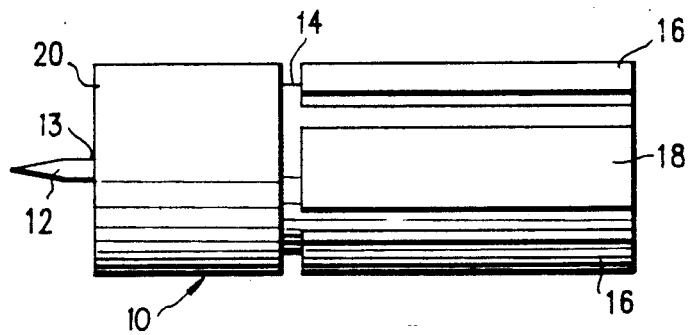
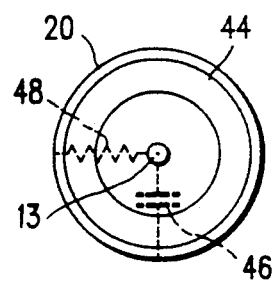
FIG. 2
FIG. 3
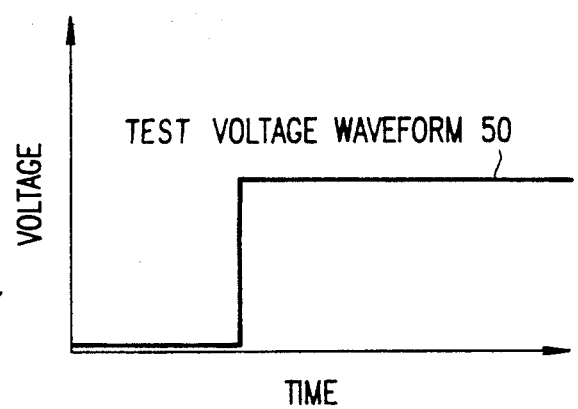
FIG. 4
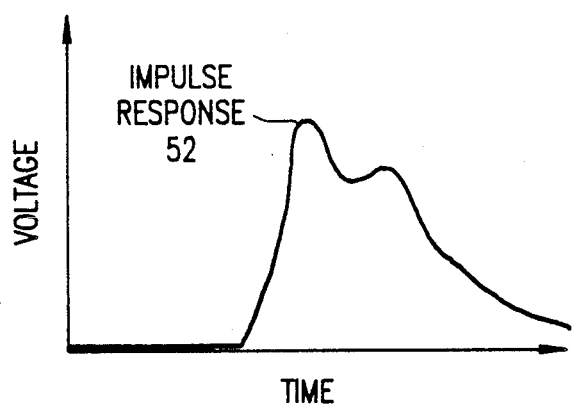
FIG. 5
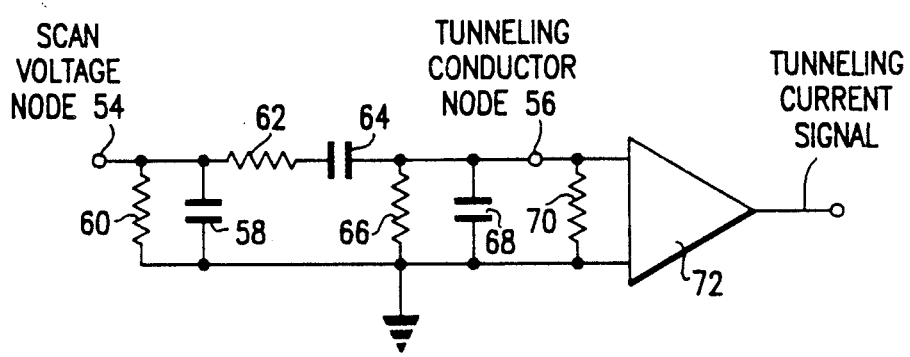
FIG. 6

SCANNING TUNNELING MICROSCOPES WITH CORRECTION FOR COUPLING EFFECTS

BACKGROUND OF THE INVENTION

1. Field of the Invention

This invention relates to scanning tunneling microscopes and, more particularly, to such microscopes which correct for the effects of scan drive and/or bias voltages on the tunneling current.

2. Description of the Prior Art

Scanning tunneling microscopes are devices which provide three-dimensional topographic images of surfaces. These devices are capable of providing resolution to atomic dimensions of surface features. In a typical scanning tunneling microscope, an extremely sharp, conducting tip is positioned two to three atomic diameters (typically ten angstroms) above a sample. If the sample surface is biased at a small voltage relative to the tip, then a current caused by the tunneling effect will flow between the sample and the tip when the tip is within atomic distance of the sample. This current is a function of the distance between the tip and the sample. A microscope of this type is described in U.S. Pat. No. 4,343,993 of Binnig et al. The sample is either a conductor, a semiconductor, or an insulator that has been thinly coated with a conductive material. Scanning tunneling microscopes require a conducting surface for operation. In some special cases, it is possible to image a non-conducting material, if it is very thin (a few atoms thick) and on a conducting surface. For instance, DNA molecules on graphite have been imaged.

The tip in a scanning tunneling microscope must be positioned with extreme accuracy in three dimensions relative to a sample. Motion perpendicular to the sample (z-axis) provides surface profile data. Motion parallel to the surface generates the scanning. In a typical system, the image is developed from a raster type scan, with a series of data points collected by scanning the tip along a line (x-axis), and displacing the tip perpendicularly in the image plane (y-axis), and repeating the step and scan process until the image is complete. The precise positioning along the x, y and z axes required to generate atomic scale images is usually accomplished with a piezoelectric transducer device. Piezoelectric devices can be made to expand or contract by applying voltages to electrodes that are placed on the piezoelectric material. The motions produced can be extremely small, with sensitivities as low as tens of angstroms per volt. The maximum deflection possible for these types of scanners is currently about 100 microns. Scanners with different deflection coefficients are used for different applications, with small coefficients used for atomic resolution images, and larger coefficient scanners used for lower resolution, larger area images. The design of the piezoelectric scanner, including the shape of the scanner and the placement of electrodes is well known in the art. Typically piezoelectric scanners for scanning tunneling microscopes have voltages as high as several hundred volts applied to them.

In a scanning tunneling microscope, either the sample can be attached to the scanner, and the tip held stationary, or the tip can be attached to the scanner, and the sample fixed. As the tip is scanned in the x and y directions, the z axis movement is closely coupled to the parameter sensed by the tip. The image is generated in two ways. In one method, the z position can be varied as the tip is scanned to maintain constant tunneling current, and the surface profile can be derived from the z scan voltage. In this method, for each x, y position, the z drive voltage corresponds to the height of the tip required to maintain constant tunneling current. The other method works by maintaining the tip at a constant z position and monitoring the variation in tunneling current as the tip is scanned in the x and y directions.

A scanning tunneling microscope can also be used for other functions besides surface profile measurement. For example, one can hold the tip stationary and vary the bias voltage applied to the sample, while monitoring the tunneling current. In this fashion local I-V characteristics can be obtained, with the same spatial resolution as can be achieved for profile data.

A typical piezoelectric scanner for a scanning tunneling microscope is a hollow tube made of piezoelectric material with a diameter of about one-half inch. The tube will have electrodes attached to various parts of its surface, which cause the tube to contract or expand and generate scanning motions when voltages are applied to the electrodes. The placement of the electrodes is dependent on the type of scanning application. The tip can be placed either in the center of the scan tube or on the rim, depending on the application. Because of the high voltages applied to the electrodes, any coupling between the electrodes and the tunneling signal can have undesirable effects. For one such scanner, the capacitive coupling between the tip and its associated connections to the z electrode, with no shielding, was observed to be on the order of half a picofarad, a number which was both calculated and measured. Shielding the electrode and the tip wire can reduce this number by about a factor of ten to 20–50 millipicofarads. Similar coupling exists between the tunneling current signal path and the x and y drive electrodes.

In addition, there may be capacitive coupling between the tunneling current signal and the sample and sample holder. This coupling will cause an effect on the tunneling current signal when the bias voltage is changed. This effect is most noticeable when I-V data is being taken.

The scanner drive voltage for z typically can slew at several volts per microsecond. Given a one volt per microsecond slew and a 40 millipicofarad coupling, and assuming no other parasitic effects, one can use the following relationship to calculate the induced tunneling current error:

$$I = C \, dV/dT$$

An induced current error of four nanoamps would be observed on the tunneling current signal, a number which is quite large compared to typical tunneling current values. The coupling to the z electrode is the most serious effect, as tunneling current and z drive voltage are connected by the feedback loop, and the induced error can lead to loop instabilities or data inaccuracies. Coupling to the x electrode is less serious, as the x drive voltage is usually a linear ramp, so the induced effect is a DC offset. However for bidirectional scanning, the x coupling causes a different offset for forward and reverse scans, an effect which is easily observed in most scanning tunneling microscopes.

The above example assumes a coupling capacitance due to the geometric configuration of the scanner that is independent of frequency. This analysis accurately describes the coupling between scan drive voltage and tunneling current signal when the primary coupling factor is the geometric capacitance inherent in the configuration of the scanner. For some scanner configurations, or as the systems become faster, with faster sampling and slew rates, smaller parasitic R and C elements can contribute significantly to the coupling effect.

As scan sizes become larger, the amplitude and slew rate of the z drive voltage increase, because to achieve large scans at high scan rates, the z drive must have the capability to follow the surface topography at high speed. As the amplitude and slew rate increase, the amount of parasitic and geometric coupling that can be tolerated between the tunneling current and the scanner drive voltages becomes extremely small, too small to eliminate entirely by the physical and electrical design of the scanner. Therefore, the ability to correct for the coupling effect would be extremely useful for improving the performance of scanning tunneling microscopes.

SUMMARY OF THE INVENTION

Accordingly, it is the principal object of the present invention to provide a method and apparatus for correcting scanning tunneling microscopes for the coupling effects of geometric capacitance and parasitic impedances on the tunneling current. To this end, the invention contemplates methods and means for measuring the coupling between the scan drive and/or bias voltages and the tunneling current circuit and methods and means for correcting for the coupling effects as the tunneling current from a sample is measured or displayed in real time.

More specifically, for the case in which the induced effects result from both geometric capacitance and parasitic impedance, the tip is withdrawn to a position at which no tunneling current will flow from the sample. A step voltage test signal is then applied to a scanning electrode or the bias voltage means. The impulse response in the tunneling current circuit is acquired by the components of the tunneling current system which includes a computer, system controller, and a digital processor. The system calculates the correction required from the relationship of a sample of the induced tunneling current signal, the value of the scan electrode voltage or bias voltage, and the impulse response function. This correction is entered in a corrector module in the digital processor of the system. When the scanning tunneling microscope is then used with the tip lowered to a position at which tunneling current will flow from the sample, the tunneling current is corrected by this module in the digital processor by subtracting the correction from the tunneling current.

In another embodiment, an FIR filter that describes the coupling effect is constructed from the impulse response in the corrector module. When the tip is lowered to the position at which tunneling current will flow and the scanning tunneling microscope is used to examine a sample, the tunneling current is corrected by applying the FIR filter in the module.

For the case in which the parasitic impedances are sufficiently small that the impulse response of the scanning tunneling microscope will decay within a sample period of the system, the induced effects may be considered as resulting from the geometric capacitance alone. With the tip again withdrawn to a position at which no tunneling current flows, a test signal having a ramp waveform is applied to a scanning electrode or the bias voltage means. The geometric capcitance is then computed from the relationship of the current in the tunneling current circuit and the slope of the ramp. With the tip again lowered toward the sample so that tunneling current again flows between the sample and the tip, the corrector module determines the correction to be subtracted from the tunneling current from the geometric capacitance and the derivative with respect to time of voltage applied to the electrode or bias means, which may be computed in a simple way, such as by computing the difference between the present and the previous current sample.

In the above embodiments, the coupling effects of the parasitic impedances and geometric capacitance are measured, or the impulse response to them is acquired, automatically by the scanning tunneling microscope system which then computes the correction to be applied to the tunneling current. It is useful to provide a method and means to allow the operator to verify that the correction determined by the system is effective. The correction is verified with the tip withdrawn to the position at which no tunneling current will flow and with the test signal applied to the scan electrode or bias means. The operator disables the corrector module and observes the impulse response as uncorrected on the display means of the system. The operator then enables the corrector module and observes the impulse response as corrected on the display means. By comparing the impulse response as uncorrected with the impulse response as corrected, the effectiveness of the correction is determined. If some residual coupling effect remains, the operator may enter adjustments of the correction through the keyboard of the system until the comparison shows that the coupling effect has been sufficiently corrected.

Rather than use the scanning tunneling microscope system to measure the coupling effects, in another implementation of the invention, the operator enters a predetermined transfer function of the relationship between the current in the tunneling current circuit and the scan drive or bias voltage waveforms through the keyboard of the system, using a computer program which translates keyboard input into coupling effect correction instructions. The system then applies a test signal to a scan electrode or the bias means, and the effectiveness of the predetermined transfer function is verified as described above. The predetermined transfer function is adjusted by the operator through the keyboard until the verification procedure shows that the coupling effect has been sufficiently corrected.

In another embodiment, the system continuously applies a test signal waveform appropriate to the type of coupling to be corrected for a scan electrode or the bias voltage means. The operator then enters assumed values of the parameters of the coupling effects, and the system determines from the entered values a correction to be applied to coupling effects in the tunneling current circuit. The display means shows the contribution of the coupling effects to the current in the tunneling current circuit. The operator then changes the entered values until the display means shows that the contribution of the coupling effects is essentially nulled out.

BRIEF DESCRIPTION OF THE DRAWINGS

A clearer understanding of the present invention will be apparent from the following description and drawings, wherein:

FIG. 2 is an elevation view of a scanner and tip used in the system of FIG. 1;

FIG. 3 is a schematic end view of the scanner of FIG. 2 showing in phantom line the geometric capacitance and parasitic impedance present therein;

FIG. 4 is a diagram of a test voltage waveform used in the method of the invention;

FIG. 5 is a diagram of an impulse response waveform resulting from the application of the test voltage waveform of FIG. 4;

FIG. 6 is an equivalent circuit diagram of the scanning tunneling microscope of FIGS. 2 and 3 incorporating the geometric capacitance and parasitic impedance effects;

DESCRIPTION OF THE PREFERRED EMBODIMENTS

Figure 1:
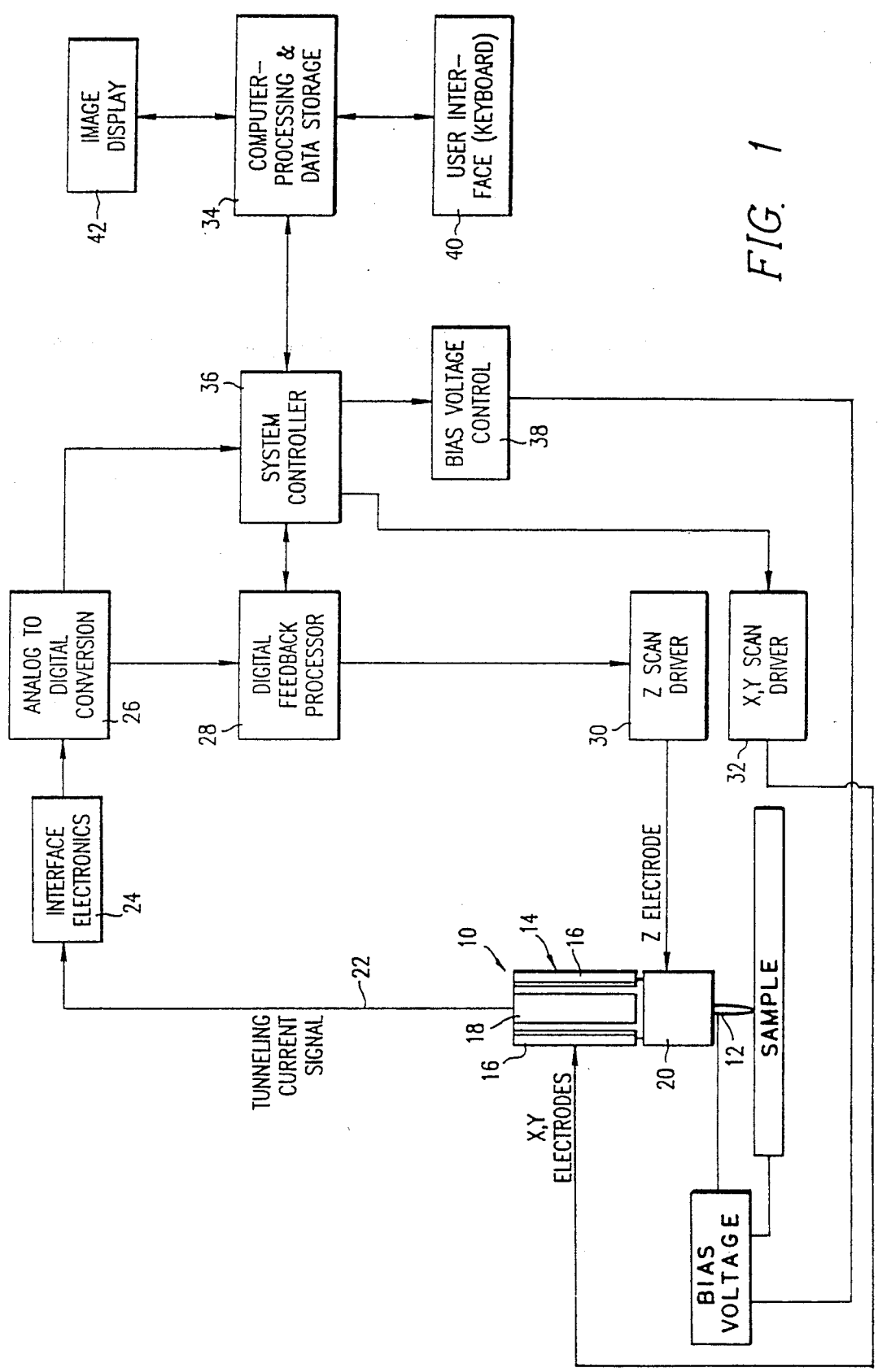
FIG. 1 Is block diagram of a scanning tunneling microscope system used for implementing the invention.

FIG. 1 shows a scanning tunneling microscope system of the prior art which is modified and used according to the invention. A scanning tunneling microscope 10 has a scanning probe tip 12 mounted at the end of a tubular piezoelectric scanner 14 on which are mounted x electrodes 16, y electrodes 18, and a z electrode 20. As is known in the art, when tip 12 is positioned sufficiently close to the surface of a sample being inspected by the microscope, tunneling current flows from the sample to tip 12 and from tip 12 through a tunneling current circuit comprising a wire extending centrally of scanner 14 and a lead 22 extending from scanner 14. The tunneling current in lead 22 is amplified in interface electronics 24 and sampled in analog-to-digital converter 26. The digital value of the tunneling current is fed back, using a feedback program in digital feedback processor 28, to z scan driver 30 which applies scan voltage to z electrode 20 to control the position of tip 12 towards and away from the surface of the sample. For scanning the tip in the x and y directions, scanning voltages are applied respectively from x, y scan driver 32 to x electrodes 16 and y electrodes 18.

The system is controlled by a computer 34 which is programmed to control a system controller 36 and digital processor 28. System controller 36 is programmed to control the generation of the scanning voltages to electrodes x, y, and z and bias voltage control 38 from which bias voltage is applied between the tip and the sample being viewed by scanning tunneling microscope 10. The user, or operator, interfaces with the system through user interface, or keyboard, 40 which communicates with the system through computer 34. Computer 34 also directs information to an image display 42, which may be a CRT.

FIG. 2 shows a typical tube type piezoelectric scanner 14 comprising a piezoelectric tubular body. Scanning tip 12 is mounted axially of one end of scanner 14 and extends beyond its end. This end of scanner 14 supports z electrode 20 which extends completely around the outside of scanner 14. The x and y electrodes comprise strip electrodes 16 and 18 on the inside, outside, or both surfaces and extending axially on scanner 14 to its other end. Tip 12 is at the end of wire 13 extending centrally of scanner 14.

It has been found that there are inherent capacitances due to the geometry of the electrodes between electrodes 16, 18, 20 and the sample and tunneling tip 12 and wire 13. This geometric capacitance 46 from one of the electrodes is shown in phantom line in FIG. 3. Geometric capacitance 46 for such a scanner was calculated to be 0.25 picofarads from the z electrode to tunneling current conductor 13; this agreed closely with a measured value of 0.4 picofarads. A capacitance of this magnitude would make this scanner undesirable, despite its favorable scanning performance. A carefully designed shielding scheme reduced the capacitance by a factor of ten. Capacitances between the drive electrodes and the tunneling current signal path of 10–50 millipicofarads for well-shielded tube scanners are typical. The data acquired with such a scanner is significantly affected by this coupling, particularly for large scans. Depending on scanner configuration, other parasitic impedance effects 48 may also factor into the coupling.

The present invention provides a method and means for measuring this coupling between the scan drive voltages applied to the x, y, z, and bias electrodes and the tunneling current wire 13. The value of this coupling is is then used to correct for this coupling effect periodically. It is extremely useful for a scanning tunneling microscope system to have this capability to determine this coupling whenever desired, because the coupling can vary with environmental conditions and as the measurement set-up is changed. The invention makes use of the existing components of the scanning tunneling microscope system, such as are illustrated in FIG. 1. The system controller 36 of the existing system already is programmable to control scan drivers 32 and 30 to provide the x and y and the z scan drive voltages, respectively, as well as to control the bias voltage 38 to provide a bias voltage. The system already has the ability to acquire the tunneling current signal. These functions, with appropriate programming of computer 34 and digital processor 28, are used to measure the coupling between the scan drive electrodes or bias voltage and the tunneling current signal circuit. A programmed test signal waveform is applied to a drive electrode or the bias voltage circuit. A current signal is induced in the tunneling current circuit due to the coupling effects, and this signal is acquired using the same electronics and acquisition system used to acquire the actual tunneling current data.

The coupling effect can be characterized by deriving the relationship that yields the induced signal as a function of the applied signal. Two specific cases of this are particularly applicable for scanning tunneling microscopes.

For the general case, where the coupling is a combination of several impedances and capacitances, the following method will determine the coupling. With tip 12 withdrawn from a sample so that no tunneling current is present, a step voltage test signal 50 (FIG. 4), which should be of the fastest slew rate that can be achieved, is applied to a drive electrode (x, y, z or bias); and the current signal induced in the tunneling current circuit is acquired. As shown in FIG. 5, the signal acquired 52 is the impulse response of the equivalent circuit that couples the drive electrodes to the tunneling current circuit. This equivalent circuit is formed by the parasitic impedance elements and the geometric capacitance of the scanner. An example of such an equivalent circuit is shown in FIG. 3, in which shunt capacitance 58 represents the shunt geometric capacitance and resistances 60, resistance 62, capacitance 64, resistance 66, capacitance 68 and resistance 70 represent the parasitic impedances. Amplifier 72 is part of interface electronics 24.

Once the impulse response is acquired, it is amplified in and coupled by interface electronics 24, converted to digital form by converter 26, and is stored in, for example, the memory of digital processor 28. The relationship between the drive voltage and tunneling current is then computed in processor 28 which is programmed to process the relationship:

$$T_s(n) = \Sigma E(k) h(n-k)$$

where $T_s(n)$ = the nth sample of the signal induced in the tunneling current circuit $E(n)$ = the value of the scan electrode drive voltage at the time of the nth sample of $T_s$ $h(n)$ = the impulse response function.

For practical purposes, only a few samples of the induced signal samples need be used to calculate a first or second order correction. It has been found that a second order correction yields significant improvement. As will be explained below, after the correction is computed it is stored either in the computer 34 or in the digital processor 28 and is substracted from the tunneling signal when the microscope is in use. The resulting tunneling current signal is corrected for the induced coupling effects.

Figure 7:
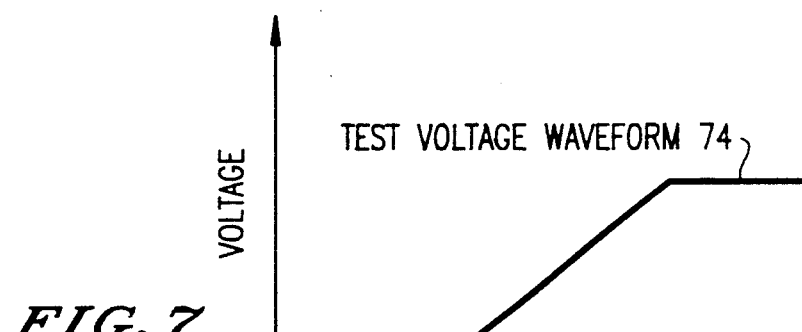
FIG. 7 is a diagram of a test voltage waveform used in another embodiment of the method of the invention.
Figure 8:
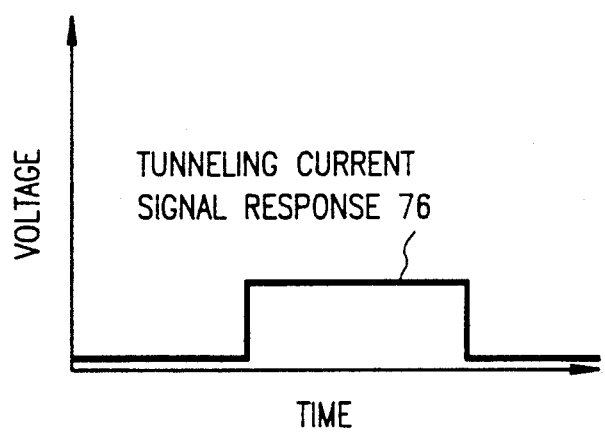
FIG. 8 is a diagram of the tunneling current signal response to the test voltage waveform of FIG. 7.

Alternatively, using signal processing relationships and programming techniques well-known to one skilled in the art, an FIR filter is constructed directly in processor 28 from the impulse response. When the microscope is in use, the tunneling current signal is passed through the FIR filter which corrects the signal for the induced coupling effects.

Where the parasitic resistance and capacitance terms other than the geometric capacitance are sufficiently small, the impulse response will decay within the sample period of the system (as determined by the sampling rate of analog to digital converter 26). In this case, the coupling effect can be treated as due to the geometric capacitance only. The user may determine that the coupling is solely due to the geometric capacitance by observing the damping characteristics of tunneling current circuit signals as displayed by image display 42. If the impulse response to a test step voltage decays within the system sample period, the user can conclude that the geometric capacitance is the only source of the coupling effect. This geometric capacitance coupling, C, is then determined by a method including the step of applying a programmed ramp test voltage waveform 74, as shown in FIG. 7 to a drive electrode. The current signal 76 induced in the tunneling current signal circuit, as shown in FIG. 8, is then measured. The relationship is given by the following:

$$I_{ts} = C dV_e/dt$$

where $I_{ts}$ = the current induced in the tunneling current circuit signal $V_e$ = the voltage applied to the electrode $dV_e/dt$ = the slope of the ramp (the first time derivative of the voltage).

Since the induced current $I_{ts}$ is the measured quantity and $dV_e/dt$ is a programmed value, C can be determined and is computed in processor 28 or computer 34.

The value of C is then stored in the memory of processor 28 to be used for computing the correction.

The procedures, both for the case where the parasitic impedances other than the geometric capacitance is significant and for the case where the coupling may be treated as due to geometric capacitance only, can be repeated for all three drive electrodes.

The procedures can be modified to determine the coupling relationship between the bias voltage and the tunneling current signal. Instead of applying the step test waveform or the programmed ramp test waveform to a drive electrode, the bias voltage applied to the sample is modulated according to these waveforms. However, for bias coupling measurements, tip 12 should be positioned very close to the sample, just out of tunneling current range. Bias coupling correction will usually be used when I-V data is acquired, since for this type of measurement the bias is varied with time.

Once the coupling relationship between the scan drive voltages or bias voltage and the tunneling current circuit is determined, its effect on the tunneling current can be corrected for. The correction could in principle be accomplished with an analog circuit implementation. However, the coupling effects may vary over time, and different scanners would have different coupling characteristics. Adjustment to this variability would make an analog implementation very cumbersome and impractical.

Figure 9:
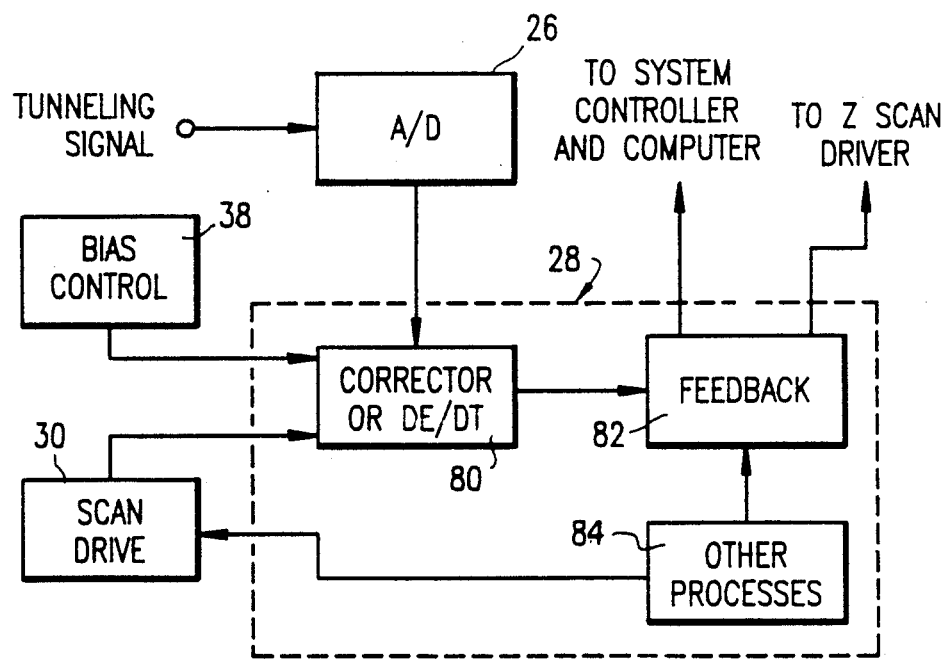
FIG. 9 is a block diagram showing the use of a corrector module in the digital processor of the system of FIG. 1.

For this reason, the preferred implementation is digital as shown in FIG. 9. After the tunneling current signal is sampled in analog-to-digital converter 26, the correction for the coupling effect is made in a corrector module 80 set up in processor 28. Corrector module 80 can be implemented by programming processor 28 to establish a program module in processor 28, as shown. Alternatively, another computing corrector device or digital processing logic could be used. Many implementations are possible, as will be apparent to one skilled in the art, given that the corrector module uses scan drive or bias voltage values in digital form from scan drive 30 or bias control 38. These values are convoluted with the tunneling current samples received from analog-to-digital converter 26 to provide correction values for correcting for the coupling effects. The tunneling current signal is thus corrected before being used in the feedback calculation in feedback circuit 82.

The relationships derived in the above methods are used to compute the tunneling current signal contribution that is due to coupling. In practice, it has been found that only two or three terms need to be used to calculate derivatives or transfer functions in order to attain adequate correction. Therefore processor 28 is programmed to adjust the tunneling current values used by the feedback processor for the coupling correction. For the filter method, a first or second order FIR filter can be used in corrector module 80 although given adequate processing speed, any order filter could be used. For the geometric capacitance only correction method, the derivative can be adequately computed with two terms using the following relationship to calculate the induced current:

$$I_{ts}(n) = C[V_e(n) - V_e(n-1)]$$

where $V_e(n)$ represents the present voltage applied to an electrode or bias voltage circuit and $V_e(n-1)$ the voltage applied when the previous tunneling current sample was taken. Again, more terms could be used if desired.

The induced current once calculated is then substracted in corrector module 80 from the tunneling current signal value before the value is used by the feedback module 82 and a module 84 for any other processing functions. This insures that both image generation in display 42 and feedback calculations are performed with true tunneling current data.

With this implementation, calculation and correction of the coupling effects is accomplished in real time, on a point-by-point basis. If the correction was done off line, at the end of an image frame, the image could have been corrected; but the feedback that generated the image would have been in error. Thus, the image correction would be suspect. Furthermore, for the z electrode, the coupling effect could generate a tunneling current signal that is out of phase with the actual signal, leading to instabilities in the control loop. In this situation, the feedback loop would need to be operated at lower gain, which would slow down the rate at which the system could scan. Hence, real time correction can also improve scan speed.

In the embodiments described above, the coupling effects are measured, or the impulse response thereto is acquired, and the correction therefor is computed automatically by the system. When using such an embodiment, it is useful to provide a method and means to allow the operator to verify that the correction determined by the system is effective to correct for the coupling effects. The correction is verified with the tip withdrawn to the position at which no tunneling current will flow and with the test signal applied to the scan electrode or bias voltage means. The computer 34 is programmed to enable the operator to deactivate and activate corrector module 80 from keyboard 40 and to adjust the correction through the keyboard. The operator deactivates the corrector module and observes the impulse response as uncorrected on display means 42. The operator then activates corrector module 80 and observes the impulse response as corrected on display means 42. By comparing the impulse respose as uncorrected with the impulse response as corrected, the effectiveness of the correction is determined. If some residual coupling effect remains, the operator may enter adjustments of the correction until the comparison shows that the coupling effect has been sufficiently corrected.

In another implementation of the invention, the system is not used to measure the coupling effects. Instead, the operator uses the keyboard to enter a predetermined transfer function of the relationship between the current in the tunneling current circuit and scan drive voltage or bias voltage, using a computer program which translates keyboard input into coupling effect correction instructions. The system then applies a test signal to a scan electrode or the bias voltage circuit, and the effectiveness of the predetermined transfer function is verified as described above. The predetermined transfer function is adjusted by the operator through the keyboard until the verification procedure shows that the coupling effect has been sufficiently corrected.

In another embodiment, system controller 36 is programmed to continuously apply a test signal waveform appropriate to the type of coupling (whether combined parasitic impedances and geometric capacitance or geometric capacitance alone) to be corrected for to the scan electrodes or bias voltage circuit. The operator then uses the keyboard to enter assumed values of the parameters of the coupling effects, and the system determines from the entered values a correction to be used in corrector module 80. Display means 42 shows the contribution of the coupling effect to the current in the tunneling current circuit. The operator then changes the entered values until the display means shows that the contribution of the coupling effects is nulled out. In this method, the operator is able immediately to observe the effect on the signal in the tunneling current circuit as the values are changed.

As already stated, the modifications of the prior art scanning tunneling microscope system of FIG. 1 to provide the necessary functions and method steps of the present invention are implemented by appropriate programming of computer 34, system controller 36 and digital processor 28. These modifications include programming to generate the test voltages, to compute the coupling effects using the equations given above, to create an FIR filter from the impulse response, to establish a corrector program module 80 in processor 28, to effectuate the corrections as explained above and to implement user input and control through keyboard 40. All of these program modifications employ programming techniques which are well within the skill of the art.

Although the invention has been described with reference to particular embodiments, it is to be appreciated that various adaptations and modifications may be made within the spirit of the invention.

The invention claimed is:

1. A method of correcting a scanning tunneling microscope system for coupling effects of parasitic impedances and geometric capacitance, said scanning tunneling microscope system comprising a scanning tip and a signal lead connected to said tip constituting a tunneling current circuit, a transducer for scanning said tip over a surface of a sample to be observed by said microscope system and to move said tip towards and away from said surface, electrodes on said transducer, means for applying scan drive voltages to said electrodes, and bias means for applying a bias voltage to said sample, said method comprising:
   withdrawing said tip to a position at which no tunneling current will flow from said sample;
   applying a test signal to one of said electrodes and bias means;
   acquiring the response induced in said tunneling current circuit in response to said application of said test signal;
   determining from said response the correction required by said scanning tunneling microscope system to correct for said coupling effects; and
   using said correction when said tip is lowered to a position at which tunneling current will flow from the sample to said tip to correct said tunneling current for said coupling effects.

2. The method of claim 1, wherein said coupling effects are corrected in real time.

3. The method of claim 1, wherein said coupling effects result from both said parasitic impedances and said geometric capacitance, and wherein said test signal is a step voltage signal, and the impulse response is acquired.

4. The method of claim 3, wherein the relationship between said induced current and said drive or bias voltage is governed by the relationship:

$$T_s(n) = \Sigma E(K) h(n-k)$$

where $T_s(n)$ is the nth sample of the induced tunneling current signal, $E(n)$ is the value of a scan electrode drive voltage or bias voltage, and $h(n)$ is the impulse response function of said parasitic impedances and geometric capacitance.

5. The method of claim 4, wherein said correction is calculated from said relationship.

6. The method of claim 4, wherein said correction is determined by constructing on FIR filter from said impulse response and wherein said FIR filter is used to correct said tunneling current when said tip is lowered to said position at which tunneling current will flow.

7. The method of claim 1, wherein said parasitic impedances are sufficiently small that the impulse response of said scanning tunneling microscope will decay within a sample period of said system and said coupling effects may be considered as resulting from said geometric capacitance alone and wherein said test signal is a ramp waveform.

8. The method of claim 7, wherein the relationship of the current $I_{ts}$ in said tunneling current circuit and the geometric capacitance C is governed by the relationship:

$$I_{ts} = C \, dV_e/dt$$

where $dV_e/dt$ is the slope of the ramp.

9. The method of claim 8, wherein the value of said geometric capacitance is calculated from said relationship.

10. The method of claim 8, wherein said system includes means for sampling said tunneling current from said tunneling current circuit, and wherein with said tip lowered toward said sample so that tunneling current flows between said sample and said tip, said correction is determined from the relationship:

$$I_{ts}(n) = C \, dV_e(n)/dt,$$

which can for most cases be adequately computed using:

$$I_{ts}(n) = C[V_e(n) - V_e(n-1)]$$

where $V_e(n)$ represents the present voltage applied to one of an electrode and said bias means and $V_e(n-1)$ represents the voltage applied when the previous tunneling current sample was taken, and wherein the value of $I_{ts}(n)$ is used as said correction and is subtracted from said tunneling current.

11. The method of claim 1, wherein said tip is positioned just out of tunneling range, and wherein said test signal is applied to said bias means.

12. The method of claim 1, wherein said system further comprises digital processor means including a corrector module and wherein said step of using said correction comprises storing said correction in said corrector module and subtracting said correction from said tunneling current.

13. The method of claim 12 wherein said correction is stored in said module automatically.

14. The method of claim 12, wherein said system includes computer means, user interface means for said computer means and display means, and wherein said correction required is displayed by said display means and a user enters said correction in said module through said user interface means.

15. The method of claim 1, wherein said system includes display means and wherein said correction is verified with said tip withdrawn to said position at which no tunneling current will flow by disabling said correction, applying said test signal to said one of said electrodes and bias means, displaying said impulse response as uncorrected on said display means, enabling said correction, again applying said test signal to said one of said electrodes and bias means, and displaying said impulse response as corrected on said display means, whereby a user can compare said impulse response as uncorrected with said impulse response as corrected.

16. A method of correcting a scanning tunneling microscope system for coupling effects of parasitic impedances and geometric capacitance, said scanning tunneling microscope system comprising a scanning tip and a signal lead connected to said tip constituting a tunneling current circuit, a transducer for scanning said tip over a surface of a sample to be observed by said microscope system and to move said tip towards and away from said surface, electrodes on said transducer, means for applying scan drive voltages to said electrodes, bias means for applying a bias voltage to said sample, computer means, user interface means for said computer means and display means, said method comprising:

entering a predetermined transfer function of the relationship between current in the tunneling current circuit and the scan drive voltage or bias voltage through said user interface means; and translating in said computer said entered transfer function into a proposed correction to correct for said coupling effects by applying a test signal to the scan electrode or bias means and verifying said correction.

17. The method of claim 16, further comprising:

verifying said correction with said tip withdrawn to a position at which no tunneling current will flow from said sample, by disabling said correction, applying a test signal to one of said electrodes and bias means displaying said impulse response as uncorrected on said display means, enabling said correction, again applying said test signal to said one of said electrodes and bias means, and displaying said impulse response as corrected on said display means; and if a comparison of said display of said impulse responses as corrected and uncorrected indicates that said coupling effects are not sufficiently corrected, entering a revision of said transfer function through said user interface means;

translating in said computer said revised transfer function into a revised correction; and repeating said verification steps and step of revising said transfer function until the displays of said impulse response as corrected and uncorrected indicate that said coupling effects are corrected.

18. A method of correcting a scanning tunneling microscope system for coupling effects of parasitic impedances and geometric capacitance, said scanning tunneling microscope system comprising a scanning tip and a signal lead connected to said tip constituting a tunneling current circuit, a transducer for scanning said tip over a surface of a sample to be observed by said microscope system and to move said tip towards and away from said surface, electrodes on said transducer, means for applying scan drive voltages to said electrodes, bias means for applying a bias voltage to said sample, computer means, user interface means for said computer means and display means, said method comprising:
- withdrawing said tip to a position at which no tunneling current will flow from said sample;
- continuously applying a test signal to one of said electrodes and bias means;
- entering through said user interface means values for said coupling effects;
- determining from said entered values a correction to be applied to coupling effects in said tunneling current circuit;
- acquiring said response induced in said tunneling circuit in response to said test signal;
- using said correction to correct said response for said coupling effects;
- displaying said corrected response on said display means;
- adjusting said entered values to adjust said correction until said display means indicates that said correction has nulled out said coupling effects; and
- using said adjusted correction when said tip is lowered to a position at which tunneling current will flow from the sample to said tip to correct said tunneling current for said coupling effects.

19. The method of claim 18, wherein said coupling effects result from both said parasitic impedances and said geometric capacitance, and wherein said test signal is a step voltage signal.

20. The method of claim 18, wherein said parasitic impedances are sufficiently small that the impulse response of said scanning tunneling microscope will decay within a sample period of said system and said coupling effects may be considered as resulting from said geometric capacitance alone and wherein said test signal is a ramp waveform.

21. The method of claim 18, wherein said tip is positioned just out of tunneling range, and wherein said test signal is applied to said bias means.

22. The method of claim 18, wherein said system further comprises digital processor means including a corrector module and wherein said step of using said correction comprises storing said correction in said corrector module and subtracting said correction from said tunneling current.

23. A scanning tunneling microscope system, comprising:
- a tunneling current circuit including a scanning tip through which a tunneling current may flow from a surface being examined;
- scanning means for scanning said tip over a surface being examined and for adjusting the spacing of said tip from said surface;
- means for applying scan drive voltages to said scanning means, there being inherent coupling between said means for applying scan drive voltages and said tunneling current circuit, said coupling introducing an error into said tunneling current signal;
- correction means for producing a correction signal for correcting said error; and
- feedback means coupled to said tunneling current circuit and wherein said correction signal is interposed between said tunneling current circuit and said feedback means.

24. The system of claim 23, wherein said correction means is digital.

25. The system of claim 23, wherein said scanning means comprises piezoelectric means.

26. The system of claim 25, wherein said piezoelectric means comprises a hollow tube of piezoelectric material and scanning electrodes on the surfaces of said tube.

27. A scanning tunneling microscope system, comprising:
- a tunneling current circuit including scanning tip through which a tunneling current signal may flow from a surface being examined;
- biasing means for applying a bias voltage to said surface, there being inherent coupling of said bias voltage into said tunneling signal current circuit, said coupling introducing an error into said tunneling current signal;
- correction means for producing a correction signal for correcting said error; and
- feedback means coupled to said tunneling current circuit and wherein said correction signal is interposed between said tunneling current circuit and said feedback means.

28. The system of claim 27, wherein said correction means is digital.

* * * * *